United States Patent [19]

Bell

[11] 4,061,577

[45] Dec. 6, 1977

[54] FIBER OPTIC MULTIPLEX OPTICAL TRANSMISSION SYSTEM

[75] Inventor: Charles H. Bell, Merritt Island, Fla.

[73] Assignee: The United States of America as represented by the Administrator of the National Aeronautics and Space Administration, Washington, D.C.

[21] Appl. No.: 715,485

[22] Filed: Aug. 18, 1976

[51] Int. Cl.² .............................................. H04B 9/00
[52] U.S. Cl. .................................. 250/199; 358/142; 179/91 R
[58] Field of Search ........................ 250/199; 358/142; 340/365 P; 179/91 R

[56] References Cited

U.S. PATENT DOCUMENTS

| | | | |
|---|---|---|---|
| 2,878,318 | 3/1959 | Leek | 358/142 |
| 3,610,933 | 10/1971 | Shaver et al. | 250/199 |
| 3,809,908 | 5/1974 | Clanton | 250/199 |
| 3,889,051 | 6/1975 | Legler | 358/142 |
| 4,004,078 | 1/1977 | Gorog | 358/142 |

Primary Examiner—Richard Murray

Attorney, Agent, or Firm—James O. Harrell; John R. Manning

[57] ABSTRACT

A multiplex optical transmission system for simultaneously transmitting and receiving a plurality of signals while minimizing external interference. The system includes a plurality of subgroup mixers wherein video signals, digital data signals, and audio signals are supplied to the respective subgroup mixers for being blocked into respective frequency ranges. The output of the subgroup mixers are, in turn, fed to a master mixer that produces a composite electrical signal therefrom. An optical transmitter is connected to the master mixer for converting the composite signal into an optical signal and transmitting the optical signal over a fiber optic cable. An optical receiver is connected to the other end of the fiber optic cable for receiving the optical signal and converting such back into a composite electrical signal. A de-multiplexer is coupled to the output of the optical receiver for separating the composite signal back into a composite video, data, and audio signals. A programmable optical patch board is interposed in the fiber optic cables for selectively connecting the optical signals to various receivers and transmitters.

6 Claims, 4 Drawing Figures

FIBER OPTIC MULTIPLEX OPTICAL TRANSMISSION SYSTEM

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The present invention relates to a multiplex system and, more particularly, to a multiplex optical transmission system wherein electrical signals are converted to optical signals for transmission to various receivers over low loss glass fibers with large bandwidths and small diameters.

Heretofore, in transmitting signals such as video, digital and audio or analog signals, very large, shielded copper cables were required. Often times these cables were drawn through underground conduit systems requiring manholes at spaced intervals as well as requiring a high degree of maintenance to minimize electrolysis and other environmental effects.

Another problem with such large cables is encountered in pulling or drawing the cables through the conduit. Such in itself is very expensive and difficult. Furthermore, copper cables wherein signals are transmitted thereover in the form of electrical signals are susceptible to interference by lightning and other electrical and environmental conditions. This requires expensive and extensive shielding of the cables. Moreover, normally these cables were of a low bandwidth and are non-linear over this bandwidth.

SUMMARY OF THE INVENTION

The invention includes a system and more particularly the multiplex optical transmission system which can simultaneously transmit and receive a plurality of signals while minimizing external interference. The system includes a means for transmitting and receiving video, digital and audio signals. Means is provided for blocking the video, digital and audio singals into particular frequency ranges. A master mixer combines these signals into a composite electrical signal. An optical transmitter is connected to the output of a master mixer for converting the composite signal into an optical signal. A fiber optic cable is provided for transmitting the optical signal from the transmitter to an optical receiver. The fiber optic cable may be in the form of one or more single fibers or it may take the form of a bundle of fibers.

The optical receiver receives the optical signal from the transmitter and converts the optical signal back to a composite electrical signal. A de-multiplexer is connected to the output of the optical receiver for separating the composite signal back into composite video, digital data and audio signals.

In one particular embodiment, optical patch boards are interposed in the fiber optic cable between a plurality of transmitters and receivers so that by programming the patch board, the signals can be sent to and from the different receivers and transmitters or through repeaters along great distances.

Accordingly, it is an important object of the present invention to provide a fiber optic multiplex optical transmission system which has a wide bandwidth and is not affected by lightning and/or other EMI and RFI type interference.

Another important object of the present invention is to provide a fiber optic multiplex optical transmission system wherein a minimum of repeaters or amplifiers are required.

Still another important object of the present invention is to provide a transmission system which utilizes fiber optic cables of very small size.

Still another important object of the present invention is to provide a system for transmitting electrical signals which is relatively inexpensive to install and requires a minimum amount of maintenance.

Still another important object of the present invention is to provide a fiber optic multiplex optical transmission system which has sufficient flexibility which enables it to handle changing data and various band width requirements by merely changing multiplexer blocks or modules.

These and other objects and advantages of the present invention will become apparent upon reference to the following specification, attendant claims and drawings.

DESCRIPTION OF A PREFERRED EMBODIMENT

Figure 1:
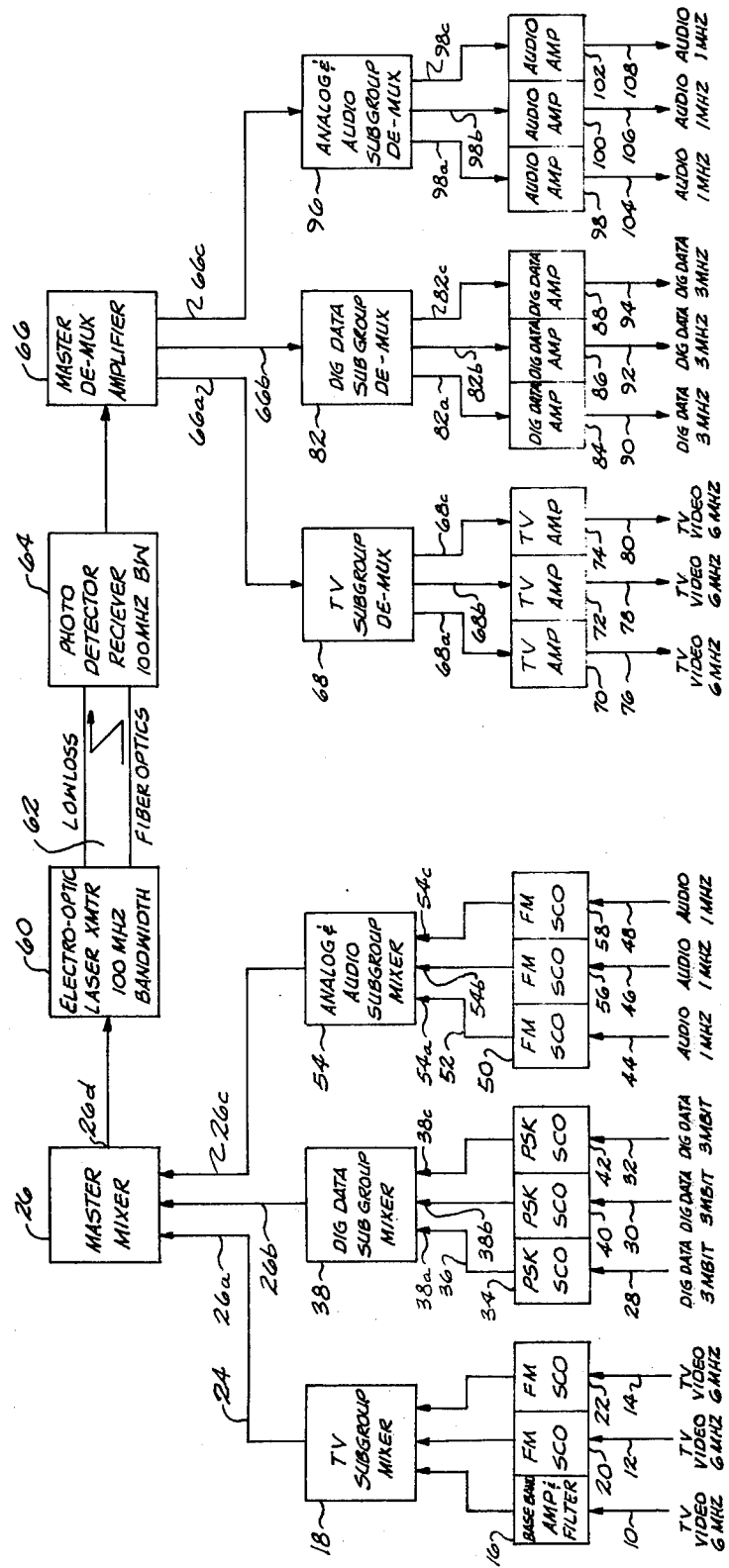
FIG. 1 illustrates in block form a fiber optic multiplex optical transmission system constructed in accordance with the present invention.

Referring in more detail to FIG. 1 of the drawings, there is illustrated a fiber optic multiplex transmission system provided for combining and transmitting video signals, digital signals and audio signals. The video or TV signals are generated by conventional television cameras and are fed into lines 10, 12 and 14, respectively. Line 10 is fed into a baseband band pass amplifier and filter 16 which blocks the signals into a 0-6 mHz such as illustrated in the frequency spectrum of FIG. 3. The output of the band pass amplifier and filter 16 is fed to a conventional subgroup mixer 18 which mixes the signal with other signals being fed thereto as will be described below.

Figure 3:
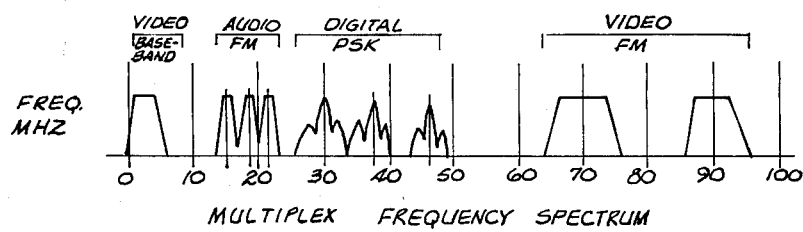
FIG. 3 is a frequency spectrum plan for the audio, digital, and video signals that are to be transmitted over the multiplex optical transmission systems of FIGS. 1 and 2.

The second channel TV signal appearing on lead 12 is fed into an FM subcarrier oscillator 20 which, in turn, blocks the signal into the frequency region between 64 mHz to 76 mHz. The output of the FM subcarrier oscillator 20 is, in turn, fed to the TV subgroup mixer 18. The signal appearing on lead 14 is fed to another FM subcarrier oscillator 22 which blocks the signal into frequency range of from 84–96 mHz such as illustrated in FIG. 3 of the drawing. The output signal from the FM subcarrier oscillator 22 is, in turn, fed to the TV subgroup mixer 18 for being mixed with the signals appearing on the outputs of the band pass amplifier and filter 16 and the FM subcarrier oscillator 20. The TV subgroup mixer 18 mixes these three signals and produces a composite TV electrical signal on output lead 24. This composite signal representing the three TV signals being fed thereto is, in turn, fed to a master mixer 26 which has three input terminals 26a, 26b and 26c and one output terminal 26d.

The digital signals which may be generated from any suitable source such as a computer are fed to the lines 28, 30 and 32. While only three input leads are illustrated, it is to be understood that many more could be utilized. A digital signal appearing on lead 28 is fed into a phase shift keyed (PSK) subcarrier oscillator 34 which, in turn, blocks the signal into a frequency range around 30 mHz. The output from the oscillator 34 is fed over lead 36 to a digital data subgroup mixer 38 which has three inputs 38a, 38b and 38c.

Similarly, the digital signals appearing on leads 30 and 32 are fed through phase shift keyed subcarrier oscillators 40 and 42 for being blocked in frequency ranges around 38 and 46 mHz, respectively. The signals are then fed to the input terminals 38b and 38c, respectively, of the digital data subgroup mixer 38 for being mixed with the signal appearing on input lead 38a. The output of the digital data subgroup mixer 38 is, in turn, fed to input terminal 26b of the master mixer 26 for being mixed with the composite signal coming in on lead 24 from the TV subgroup mixer 18.

Audio signals are applied to leads 44, 46 and 48. Lead 44 is, in turn, coupled to an FM subcarrier oscillator 50 which blocks the signal in a frequency range around 15 mHz. This signal is fed over lead 52 to input terminal 54a of a subgroup mixer 54. While is has been indicated that a single audio signal appears on lead 44, in actual practice, there are 120 voice channels appearing on lead 44. Therefore, on the three leads 44, 46 and 48, there are 360 voice channels which can be selectively utilized. It should also be noted that these audio signals may be replaced with analog data signals whose bandwidths do not exceed the audio channel bandwidths.

The audio signal appearing on the voice channel 46 is fed to a frequency modulation (FM) subcarrier oscillator 56 which blocks the audio signal around 19 mHz and couples the signal to input terminal 54b of the subgroup mixer 54. Similarly, the signals appearing on 48 are coupled through a frequency modulation (FM) subcarrier oscillator 58, operating at 21 mHz, and are connected to input terminal 54c of subgroup mixer 54. The subgroup mixer 54 mixes the three audio signal groups appearing on lead 44, 46 and 48 to produce a composite audio signal that is fed to the input terminal 26c of the master mixer 26.

The master mixer combines the three signals from the TV subgroup mixer 18, the digital data subgroup mixer 38 and the audio subgroup mixer 54 producing a composite electrical signal on output lead 26d.

This composite electrical signal appearing on output lead 26d is fed to an electro optic laser transmitter 60 which converts the electro-signal into an optical signal. While an electro-optic laser transmitter 60 is illustrated as being utilized, it is to be understood that an acousto-optical laser transmitter, injection laser, or a light emitting diode (LED) could be used instead.

The optical signal produced by the electro-optic laser transmitter 60 is transmitted over a low loss optic cable 62 to a photo detector receiver 64. The fiber optic cable may take the form of a single fiber 62 or it can be a fiber optic bundle.

The photo detector receiver 64 receives the optical signal and converts it back to a composite electrical signal. In one particular embodiment, the fiber is 1,000 ft. long, however, it is to be understood that the primary limiting factor as to the length of the fiber optic cable is the power of the transmitter 60. However, repeaters or amplifiers may be interposed in the cable at predetermined distances for transmitting optical signals over long distances.

The electrical signal appearing on the output of photo detector receiver 64 is fed to a master de-multiplexer and amplifier circuit 66 which separates the composite signal into three individual groups of signals representing the TV signals, the digital signals and the audio signals. The TV signals appear on output lead 66a and are fed to a TV subgroup de-multiplexer 68 which, in turn, separates the composite TV signal into three standard television channels 68a, 68b and 68c. These channels 68a, 68b and 68c are connected to TV amplifiers 70, 72, and 74 for amplifying the TV signals and producing such on output terminals 76, 78 and 80 for being fed into conventional monitoring equipment.

The digital signals appearing on output lead 66d of the master de-multiplexer 66 are fed to a digital data subgroup de-multiplexer 82 which separates the composite digital signals into three digital signals appearing on output leads 82a, 82b and 82c for being connected to digital data amplifiers 84, 86 and 88, respectively.

The outputs of digital data amplifiers 84, 86 and 88 are connected to leads 90, and 92 and 94, respectively and are fed to conventional computing or other digital equipment.

The output lead 66c of the master de-multiplexer amplifier 66 is fed to audio subgroup de-multiplexer 96 which separates the composite audio signal into three audio signals appearing on output leads 96a, 96b and 96c. The leads 96a, 96b and 96c are, in turn, connected to audio amplifiers 98, 100 and 102, respectively, for being amplified and connected to appropriate leads 104, 106 and 108. These output terminals or leads may be connected to conventional single side band voice de-multiplexer equipment, single channel audio equipment, or conventional analog equipment.

It is to be understood that one particular multiplexing scheme using subcarrier oscillators has been illustrated in connection with FIG. 1, other conventional subcarrier techniques compatible with the system could be utilized. As a result of multiplexing the various signals, a large amount of information may be transmitted safely and accurately over long distances by means of single fiber cables or fiber bundles.

Figure 2:
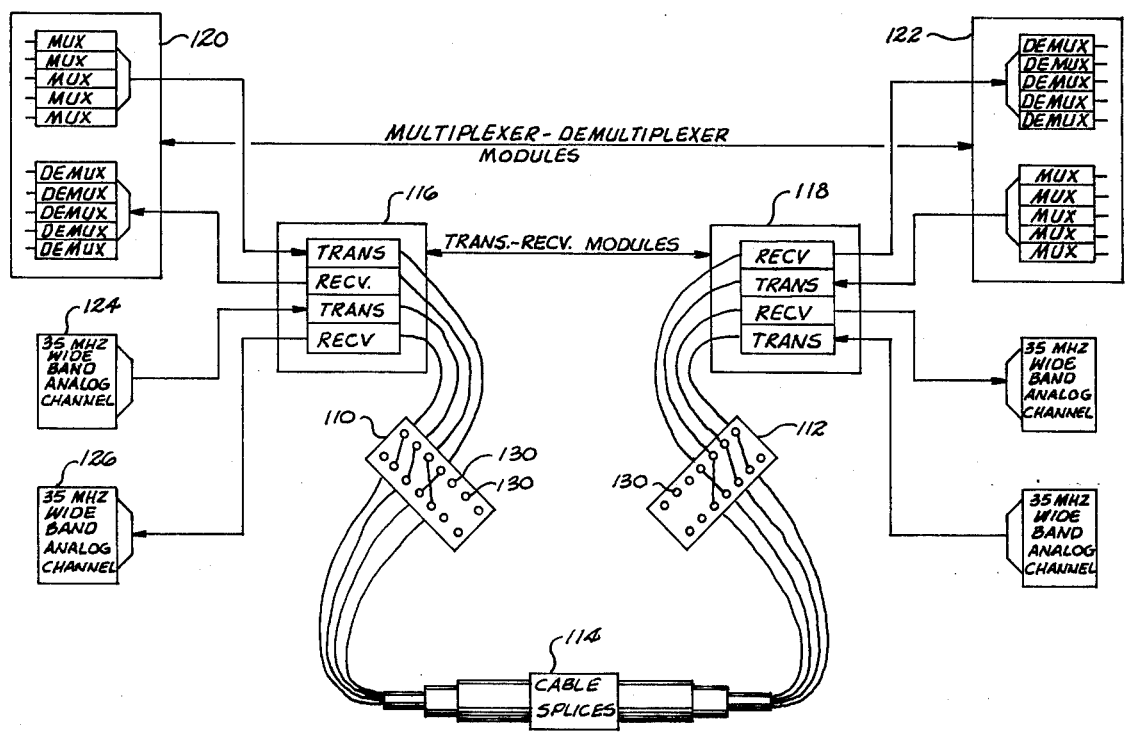
FIG. 2 illustrates a modified form of a multiplex optical transmission system.

In FIG. 2 of the drawing, there is illustrated a multiplex optical transmission system which is much more flexible than the system illustrated in FIG. 1 in that it includes a pair of patch boards 110 and 112. The patch boards 110 and 112 enable the optical signals to be patched to the various different fiber cables extending through the composite cable 114 connected between optical transmitters and receivers enclosed in boxes 116 and 118, respectively. Various multiplexing systems and de-multiplexing systems as illustrated in boxes 120 and 122, may be selectively coupled to each other through or by means of programming the patch boards 110 and 112. Similarly, other wide band analog channels, such as disclosed in boxes 124 and 126, can be connected into the system by use of the optical patch boards 110 and 112.

As to the operation of the system which includes the multiplexing and de-multiplexing elements enclosed in boxes 120 and 122, the operation is the same as that described previously in connection with FIG. 1, except for the patching of signals through the patch boards 110 and 112. The patch board is illustrated as being a manual patch board having a plurality of optic connectors 130 positioned thereon, but it is to be understood that patching could be accomplished automatically through other optical manipulating devices.

Figure 4:
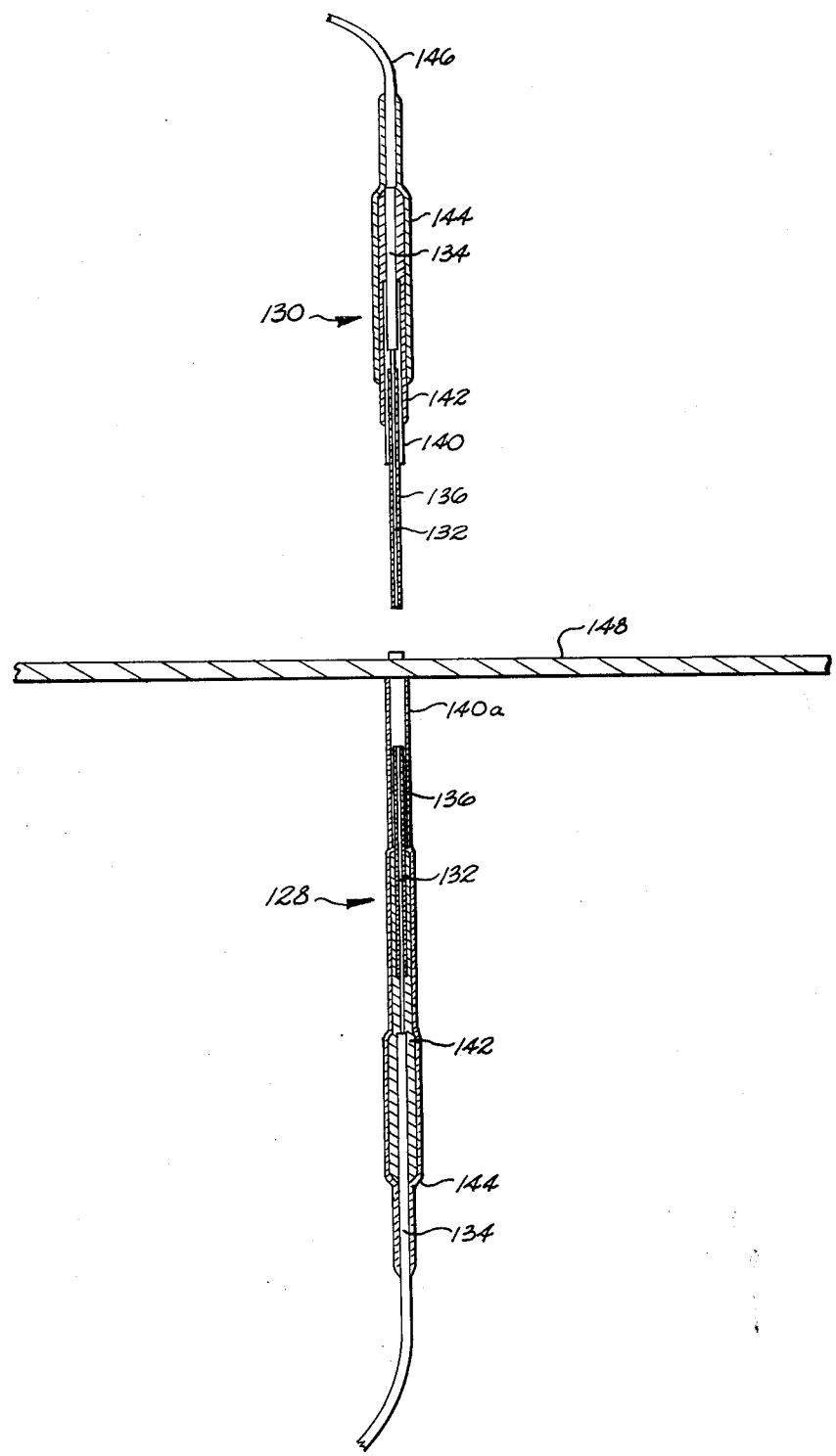
FIG. 4 is a sectional view illustrating a coupling device forming part of the patch board of FIG. 2.

Referring in more detail to FIG. 4 of the drawing, there is illustrated a coupling device utilized in conjunction with the patch boards 110 and 112. Each of the coupling devices includes a female portion generally designated by the reference character 128 and a male portion generally designated by the reference character 130. The male portion 130 includes an optic fiber 132 which has a conventional protective fiber buffering layer 134 provided thereon. In order to add rigidity to the male probe 130, a hypodermic needle 136 which in one particular embodiment has an inside diameter of 6 millimeters and outside diameter of 12 millimeters extends over a lower portion of the fiber 132. Surrounding the fiber carrying needle 136 is a male guide needle 140 which has an inside diameter of 12.5 millimeters. The fiber carrying needle may be force fit within the male guide needle 140 or in some particular applications secured by any suitable means such as adhesive. The male guide needle 140 is enclosed within a shrink tube 142 which encircles a portion of the male guide needle 140 as well as the upper portion of the fiber 132 and fiber buffering layer 134 extending therearound. Another external shrink tube 144 encircles the entire probe for providing a protective coating. Similarly, a protective tube 146 extends around the fiber and fiber buffering. This protective tube may be any suitable conventional coating that is relatively flexible so as to enable the fiber cable to be readily manipulated.

The female portion 128 of the coupling extends through a board 148 which forms the surface of the patch board. It is held stationary within the board by any suitable means such as adhesive. The female portion is constructed in the same manner as the male portion 130 with the exception that the tubes are recessed so that the male portion 130 can be plugged therein. Like reference characters are utilized for the identical components of the female portion as on the male portion 130. The fiber 132 and fiber carrier needle 136 of the female portion 128 are encased in fiber guiding needle 140a, but terminate short of the end of guiding needle 140a so as to define a socket. The fiber guiding needle 140a is identical to the fiber guide needle 140 of the male portion. The fiber 132 is recessed slightly within the fiber carrier needle 136 so that when the end of the fiber guide needle 136 of the male portion abuts against the fiber guide needle 136 of the female portion, there is a very small distance between the ends of the fibers 132. The purpose of this is to prevent the ends of the fibers from being damaged or scratched if some abrasive material happens to be lodged thereon.

While the particular coupling illustrated enables readily plugging and unplugging of connectors so as to readily couple particular fibers together, other types of couplings could be utilized. In one particular embodiment (not shown) the housing in which the male and female coupling are carried are threaded so that one can be screwed into each other for securing them together.

While a preferred embodiment of the invention has been described using specific terms, such description is for illustrative purposes only, and it is to be understood that changes and variations may be made without departing from the spirit or scope of the following claims.

What is claimed is:

1. A multiplex optical transmission system for simultaneously transmitting and receiving a plurality of signals while minimizing external interference, said system comprising:
   a. a plurality of video signals,
   b. means for blocking said video signals into respective frequency ranges,
   c. a video subgroup mixer means for mixing said video signals of said frequency ranges and generating a single composite video signal,
   d. a plurality of data signals,
   e. means for blocking said data signals into respective data frequency ranges,
   f. a data subgroup mixer means for mixing said data signals of said frequency ranges and generating a composite data signal,
   g. a master mixer connected to the output of said video subgroup mixer and said data subgroup mixer producing a composite electrical signal,
   h. an optical transmitter connected to said master mixer converting said composite electrical signal into an optical signal,
   i. a fiber optic cable having one end connected to said optic transmitter,
   j. an optical receiver connected to the other end of said fiber optic cable receiving said optical signal being transmitted over said fiber optic cable and converting said optical signal back to a composite electrical signal,
   k. a de-multiplexer connected to the output of said optic receiver separating said composite siganl into a composite video signal and a composite data signal,
   l. means connected to said de-multiplexer for separating said composite video signal and said composite data signals into individual video signals of respective frequencies and into individual data signals of respective frequencies.

2. The multiplex optical transmission system as set forth in claim 1 wherein said plurality of data signals include digital data signals and audio data signals.
   a. means for blocking said digital data signals into respective frequency ranges, and
   b. means for blocking said audio data signals into respective frequency ranges.

3. The multiplex optical transmission system as set forth in claim 1 wherein said fiber optic cable is a single elongated fiber.

4. The multiplex optical system as set forth in claim 3 further comprising:
   a. an optic patch board having optical couplings therein,
   b. a plurality of optical transmitters,
   c. a plurality of optical receivers and converters,
   d. means for supplying composite electrical signals to said transmitters,
   e. a plurality of fiber optical cables connecting said optical transmitters and said optical receivers to said optical patch board, and
   f. means for programming said optical patch board for selectively connecting said optical transmitters to said optical receivers.

5. A multiplex optical transmission system for simultaneously transmitting and receiving a plurality of signals while minimizing external interference, said system comprising:
   a. a plurality of video and data signals, b. a plurality of multiplexing circuits producing a plurality of composite signals from said video and data signals,
c. a plurality of de-multiplexing circuits,
d. means for supplying said video and data signals to said multiplexing circuits,
e. an optical patch board having optical couplings thereon,
f. a plurality of optical transmitters connected to said multiplexing circuits generating optical signals responsive to said composite signals,
g. a plurality of optical receivers for converting optical signals to composite electrical signals.
h. a plurality of fiber optic cables connecting said optical transmitters and said optical receivers to said optical patch board, and
i. means for programming said optical patch board for selectively connecting said optical transmitters to said optical receivers.

whereby optical signals can be readily transmitted to selected receivers by merely changing the programming of said optical patch board.

6. The multiplex optical system as set forth in claim 5 wherein said optical coupling includes:
   a. a female socket and a male plug,
   b. said female socket including
      i. an elongated fiber carrier needle,
      ii. an optic fiber extending into said needle,
      iii. a guide needle encircling said fiber carrier needle and having a portion extending outwardly therebeyond,
   c. said male plug including
      i. an elongated fiber carrier needle, and
      ii. an optic fiber extending into said needle,
      iii. said elongated fiber carrier needle having an external diameter slightly less than said internal diameter of said guide needle forming part of said female socket,
whereby said male plug can be readily inseted in said female socket from providing optical coupling between said optic fibers carried therein.

* * * * *